United States Patent
Wang (10) Patent No.: US 7,420,942 B2
(45) Date of Patent: Sep. 2, 2008

(54) DIFFERENT DELIVERY TRAFFIC INDICATION MESSAGE (DTIM) PERIODS FOR DIFFERENT WIRELESS NETWORKS HAVING DIFFERENT NETWORK NAMES

(75) Inventor: James Wang, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 494 days.

(21) Appl. No.: 11/008,023

(22) Filed: Dec. 9, 2004

(65) Prior Publication Data

US 2006/0126533 A1    Jun. 15, 2006

(51) Int. Cl.
*H04Q 7/00* (2006.01)
*H04L 12/423* (2006.01)

(52) U.S. Cl. .................................. 370/329; 370/449
(58) Field of Classification Search .................. None
See application file for complete search history.

(56) References Cited

U.S. PATENT DOCUMENTS

| | | | |
|---|---|---|---|
| 4,707,832 A | 11/1987 | Glenn et al. |
| 6,067,297 A | 5/2000 | Beach |
| 6,438,117 B1 | 8/2002 | Grilli et al. |
| 6,674,738 B1 | 1/2004 | Yildiz et al. |
| 6,697,415 B1 | 2/2004 | Mahany |
| 6,795,409 B1 | 9/2004 | Youssefmir et al. |
| 6,842,460 B1 | 1/2005 | Olkkonen et al. |
| 6,856,603 B1 | 2/2005 | Vollmer et al. |
| 6,952,181 B2 | 10/2005 | Karr et al. |
| 6,982,968 B1 | 1/2006 | Barratt et al. |
| 7,043,259 B1 | 5/2006 | Trott |
| 7,062,294 B1 | 6/2006 | Rogard et al. |
| 7,120,138 B2 | 10/2006 | Soomro et al. |
| 7,126,926 B1 | 10/2006 | Bjorklund et al. |
| 7,142,535 B2 | 11/2006 | Kubler et al. |
| 7,167,713 B2 | 1/2007 | Anderson |
| 7,181,190 B2 | 2/2007 | Abhishek et al. |
| 7,206,594 B2 | 4/2007 | Shostak |
| 7,212,832 B2 | 5/2007 | Yokota |

(Continued)

FOREIGN PATENT DOCUMENTS

EP    0615364    9/1994

(Continued)

OTHER PUBLICATIONS

"Wireless LAN MAC & PHY specifications: Higher-Speed Physical Layer Extension in the 2.4 GHz Band", 802.11b: Part 11: Wireless LAN Medium Access Control (MAC) and Physical Layer (PHY) specifications: Higher-Speed Physical Layer Extension in the 2.4 GHz Band IEEE STD 802.11B-1999, XP002240048, (Jan. 20, 2000),p. 89.

(Continued)

*Primary Examiner*—Wing F. Chan
*Assistant Examiner*—Gregory B Sefcheck
(74) *Attorney, Agent, or Firm*—Integral Intellectual Property Inc.; Miriam Paton (57) ABSTRACT

A single access point may manage two or more wireless networks, each having a network name. The access point may be configured to store delivery traffic indication message (DTIM) period values on a per network name basis. A processor of the access point may manage, on a per network name basis, timing of transmission of delivery traffic indication messages.

21 Claims, 6 Drawing Sheets

U.S. PATENT DOCUMENTS

| | | | |
|---|---|---|---|
| 7,224,970 | B2 | 5/2007 | Smith et al. |
| 7,236,470 | B1* | 6/2007 | Bims .......................... 370/328 |
| 7,236,787 | B1 | 6/2007 | Tamura et al. |
| 2003/0174645 | A1 | 9/2003 | Paratainen et al. |
| 2004/0013128 | A1* | 1/2004 | Moreton et al. ............. 370/447 |
| 2004/0072559 | A1 | 4/2004 | Kakumaru et al. |
| 2004/0103282 | A1 | 5/2004 | Meier et al. |
| 2004/0151149 | A1 | 8/2004 | Song et al. |
| 2005/0124294 | A1* | 6/2005 | Wentink ..................... 455/41.2 |
| 2005/0128988 | A1* | 6/2005 | Simpson et al. ............. 370/338 |
| 2005/0147073 | A1* | 7/2005 | Hietalahti et al. ........... 370/338 |
| 2005/0201341 | A1* | 9/2005 | Griswold ..................... 370/338 |
| 2005/0243737 | A1* | 11/2005 | Dooley et al. ............... 370/254 |

FOREIGN PATENT DOCUMENTS

| | | |
|---|---|---|
| EP | 0907262 | 4/1999 |
| EP | 1206070 | 5/2002 |
| EP | 1311086 | 5/2003 |
| EP | 1564930 | 8/2005 |

OTHER PUBLICATIONS

"Broadband Radio Access Networks (BRAN); HIPERLAN Type 2; Data Link Control (DLC) Layer; Part 1: Basic Data Transport Functions", ESTI TS 101 761-1 V1.3.1 Dec. 2001.

"ETSI TS 101 761-2 V1.3.1 (200-01)", chapter 5.2.6 ETSI: "Broadband Radio Access Networks (BRAN); HIPERLAN Type 2; Data Link Control (DLC) Layer; Part 2: Radio Link Control (RLC) sublayer" Jan. 2002, 1-13, 92-97.

"IEEE 802.11 1999 (R2003) pp. 401 407", 1999 (revised 2003), 471-474.

"IEEE 802.11 1999 (R2003) select pp. 1 to 137", 7.2.3.1, 7.2.3.4, 7.2.3.6, 7.3.1.6, 7.3.2.6, 10.3.1.1, 10.3.2.2, 10.3.6.1, 10.3.7.1, 10.3.10.1. 11.2.1 1999 (Revised 2003), 1-8, 34-58, 98-137.

"IEEE 802.11b-1999 p. 89", 1999, 89.

El-Hoiydi, A. et al., "Low power MAC Protocols for infrastructure Wireless sensor networks", abstract; FIG. 3 col. 2, paragraphs 2 -3 col. 5, paragraphs 1-2 col. 6 paragraph 7 - col. 9 paragraph 1 Feb. 24, 2004.

"ISO/IEC 8802.11 (ANSI/IEEE 802.11) Chapter 11 pp. 123-137", 1999, 123-137.

Jung, Eun-Sun et al., "An Energy Efficient MAC Protocol for Wireless LAN", 2002.

"Wireless LAN Medium Access Control (MAC) and Physical Layer (PHY) specifications: Higher-Speed Physical Layer Extension in the 2.4 GHz Band", IEEE Tsd 802.11b-1999 2000.

* cited by examiner

DIFFERENT DELIVERY TRAFFIC INDICATION MESSAGE (DTIM) PERIODS FOR DIFFERENT WIRELESS NETWORKS HAVING DIFFERENT NETWORK NAMES

BACKGROUND OF THE INVENTION

The invention generally relates to wireless networks. In particular, embodiments of the invention relate to power saving in a wireless network using two or more service set identifiers.

A wireless access point (AP) is a device that "connects" wireless devices together to create a wireless network. The wireless devices, also known as "client devices", communicate with each other or with other networks through the AP. A service set identifier (SSID) is a label or name that distinguishes one wireless network from another. Client devices use the SSID to establish and maintain connectivity.

Some access points (known as "enterprise-class access points") support multiple SSIDs. For example, some commercially available access points support up to 32 separate SSIDs.

Network managers can assign different policies and functions for each wireless network, increasing the flexibility and efficiency of the network infrastructure. In a corporation using virtual local area networks (VLANs), SSIDs may be assigned to enable the separation of wireless applications based on security and performance requirements. For example, one could enable encryption and authentication on one wireless network to protect private applications and no security on another wireless network to maximize open connectivity for public usage. In another example, SSIDs may be assigned to group together client devices having common usage characteristics, so that data users such as laptops are assigned one SSID and voice users such as cellphones are assigned another SSID. In a further example, SSIDs may be assigned according to an organizational structure, so that client devices used by executives are assigned one SSID that will give them high priority, and client devices used by others at the company are assigned another SSID that will give them a lower priority.

Client devices may be battery-powered, and it is beneficial to enhance the battery lifetime.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Figure 1:
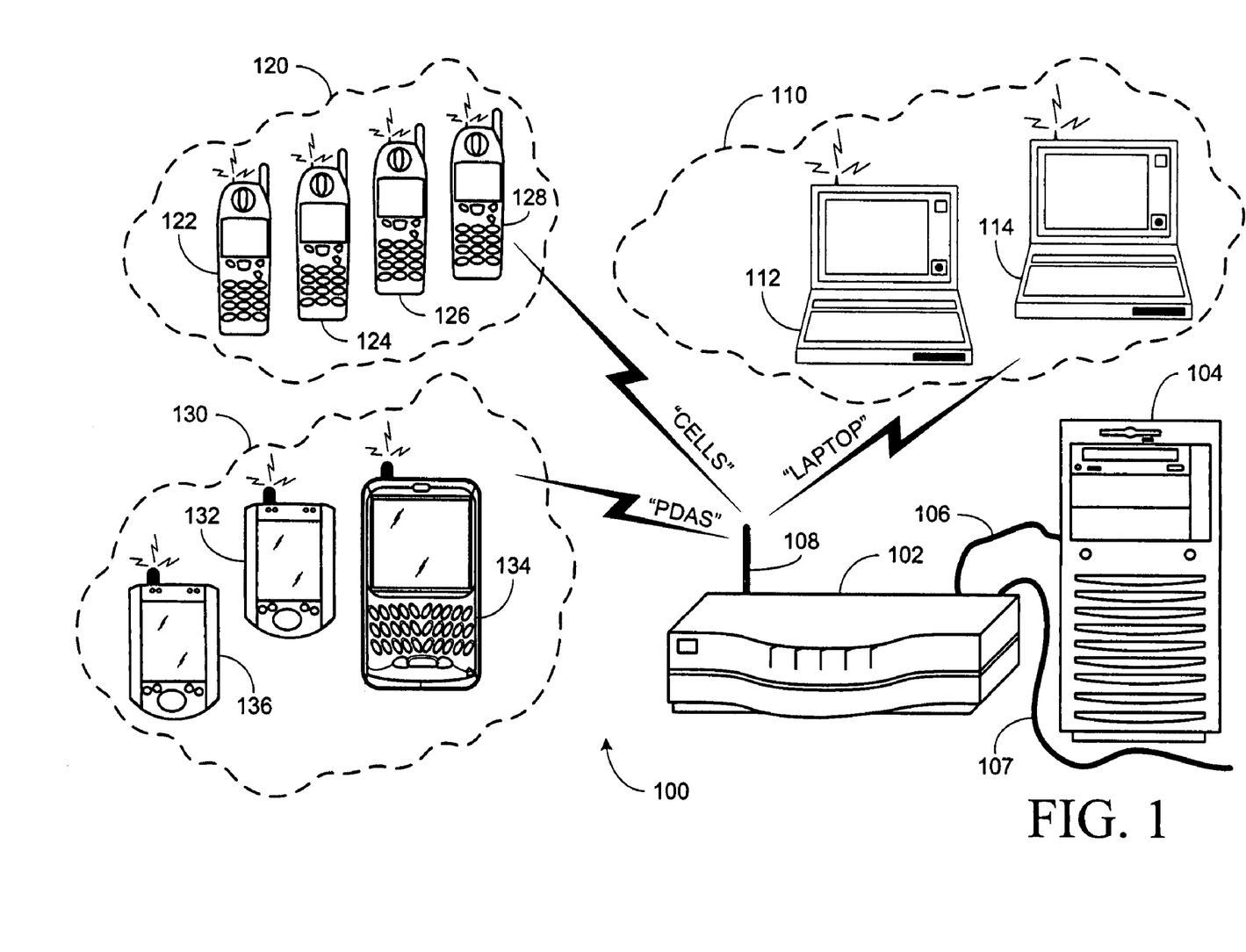
FIG. 1 is an illustration of an exemplary communications system, according to embodiments of the invention.

FIG. 1 is an illustration of an exemplary communications system 100 according to embodiments of the invention. System 100 includes a wireless access point (AP) 102 and a computer 104 coupled via a wired connection 106. Another wired connection 107 may connect AP 102 to the Internet, for example, via a cable modem (not shown). Computer 104, wired connection 106, wired connection 107, the cable modem and the Internet may all be part of a "distribution system" for AP 102.

AP 102 has at least one antenna 108 and is configurable to support two or more wireless network names, for example, two or more service set identifier (SSIDs). A non-exhaustive list of examples for antenna 108 includes a dipole antenna, a monopole antenna, a multilayer ceramic antenna, a planar inverted-F antenna, a loop antenna, a shot antenna, a dual antenna, an omnidirectional antenna and any other suitable antenna. AP 102 may include a router.

AP 102 creates a wireless network 110, identified by a first SSID, for example "LAPTOP", with wireless-enabled laptops 112 and 114. Similarly, AP 102 creates a wireless network 120, identified by a second SSID, for example "CELLS", with cellphones 122, 124, 126 and 128. Similarly, AP 102 creates a wireless network 130, identified by a third SSID, for example "PDAS", with personal digital assistants (PDAs) 132, 134 and 136. The three wireless networks 110, 120 and 130 all use the same radio frequency channel.

The client devices shown in FIG. 1 are just an example and other suitable client devices and groupings of client devices are also possible. The client devices are configurable to belong to a wireless network having a particular SSID. A non-exhaustive list of examples for client devices includes work stations, server computers, notebook computers, laptop computers, desktop personal computers (PCs), personal digital assistant (PDA) computers, hand-held computers, wireless local area network (WLAN) stationary units, WLAN add-on cards, WLAN personal computer memory card international association (PCMCIA) cards, WLAN PC cards, WLAN switches, WLAN routers, WLAN servers, game consoles, digital cameras, digital video cameras, television sets and the like.

Among other communications, AP 102 may transmit broadcast and/or multicast traffic to the client devices (laptops 112 and 114, cellphones 122, 124, 126 and 128 and PDAs 132, 134 and 136). Each client device has a unique medium access control (MAC) address and is assigned an identifier by AP 102.

In this example, AP 102 and the client devices are all "802.11-enabled", which means that wireless communications therebetween are in accordance with one or more of the following "Wi-Fi" standards defined by the Institute of Electrical and Electronic Engineers (IEEE) for Wireless LAN MAC and Physical layer (PHY) specifications:

| Standard | Published | Maximum Speed | Frequency | Modulation |
|---|---|---|---|---|
| 802.11 | 1997 | 2 Mbps | 2.4 GHz | Phase-Shift |
| 802.11a | 1999 | 54 Mbps | 5.0 GHz | Orthogonal Frequency Division Multiplexing |
| 802.11b | 1999 | 11 Mbps | 2.4 GHz | Complementary Code Keying |
| 802.11g | 2003 | 54 Mbps | 2.4 GHz | Orthogonal Frequency Division Multiplexing |

However, it will be obvious to those of ordinary skill in the art how to modify the following for other existing WLAN standards or future related standards.

Figure 2:
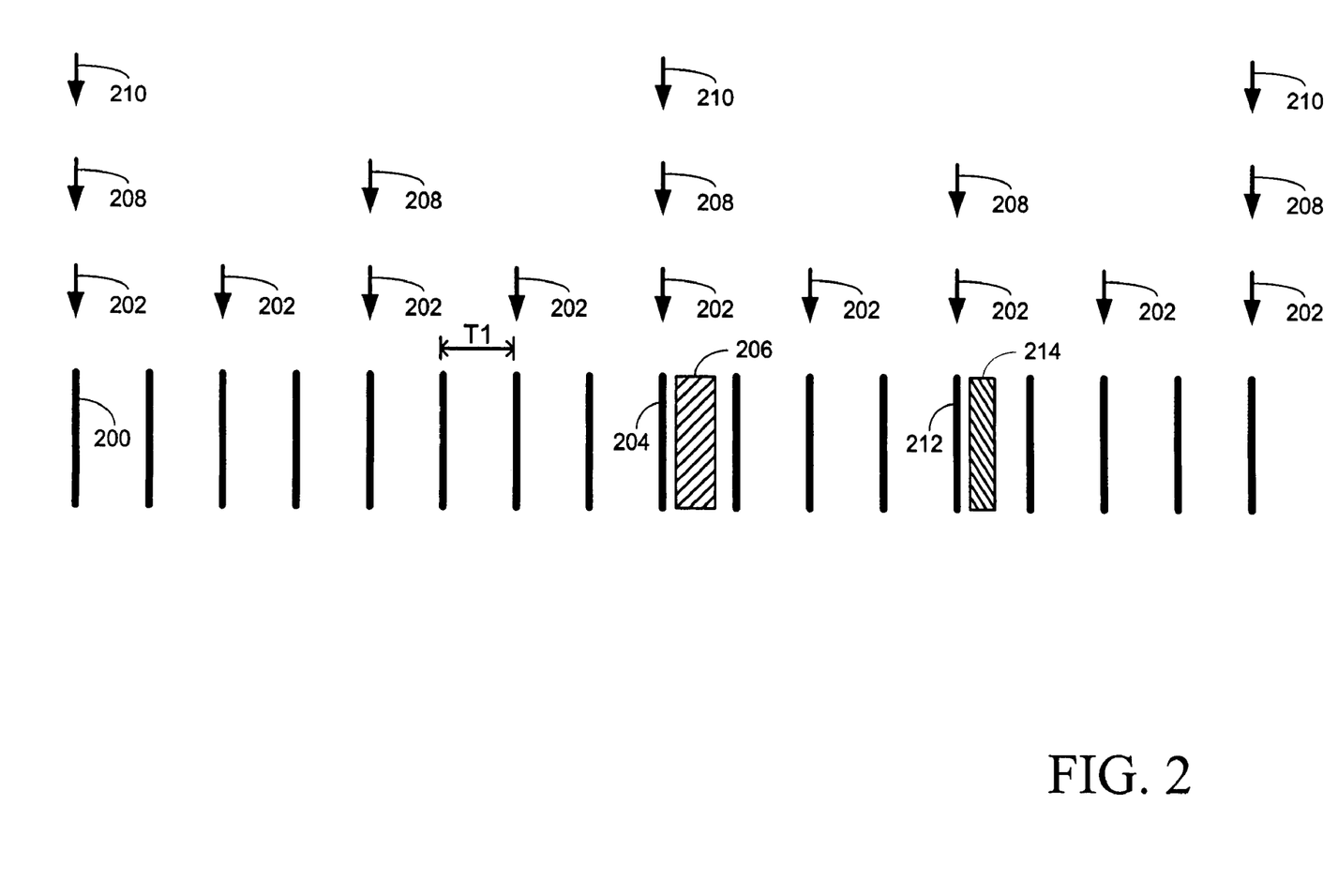
FIG. 2 is an illustration of a single exemplary sequence of beacon frames, helpful in understanding embodiments of the invention.

AP 102 transmits beacon frames at regular intervals to announce the existence of and to synchronize wireless networks. The amount of time between the start of consecutive beacon frames is a "beacon interval". FIG. 2 shows beacon frames 200 at beacon intervals of T1.

According to the 802.11 standards, a Delivery Traffic Indication Message (DTIM) period value is a number that determines how often a beacon frame includes a Delivery Traffic Indication Message, and this number is included in each beacon frame. For example, each beacon frame 200 may include a DTIM period of 2 and every other beacon frame 200, as indicated by arrows 202, may include a DTIM.

A DTIM is included in beacon frames, according to the DTIM period, to indicate to the client devices whether the access point has buffered broadcast and/or multicast data waiting for them. Following a beacon frame that includes a DTIM, the access point will release the buffered broadcast and/or multicast data, if any exists. For example, if a DTIM included in a particular beacon frame 204 indicates the existence of broadcast data, that broadcast data will be transmitted (shown graphically as a diagonally hatched block 206) after beacon frame 204 and before the next beacon frame after beacon frame 204.

The 802.11 standards define a power-save mode for client devices. In power-save mode, a client device may choose to sleep for one or more beacon intervals waking for beacon frames that include DTIMs. When the DTIM period is 2, a client device in power-save mode will awaken to receive every other beacon frame, as indicated by arrows 202. The higher the DTIM period, the longer a client device may sleep and therefore the more power that particular client device may potentially save. Since beacon frames are sent using the mandatory 802.11 carrier sense multiple access/collision detection (CSMA/CD) algorithm, the access point must wait if a client device is sending a frame when the beacon is to be sent. As a result, the actual time between beacons may be longer than the beacon interval. Client devices that awaken from power-save mode may find that they have to wait longer than expected to receive the next beacon frame. Client devices, however, compensate for this inaccuracy by utilizing the timestamp found within the beacon frame.

Upon entering power-save mode, a client device will transmit a notification to the access point, so that the access point will know how to handle unicast traffic destined for the client device. The client device will begin to sleep according to the DTIM period, as explained above. Typically, the network manager has configured the DTIM period in the access point.

Client devices in wireless networks 110, 120 and 130 may have conflicting requirements for power consumption and communication throughput when in power-save mode. For example, laptops 112 and 114 may require relatively high communication throughput and may have low sensitivity to power consumption. Therefore, a relatively low DTIM period, for example 1, may be suitable for laptops 112 and 114. However, cellphones 122, 124, 126 and 128 may require relatively low communication throughput and may be operated by batteries of relatively low capacity. Therefore, a relatively high DTIM period, for example 8, may be suitable for cellphones 122, 124, 126 and 128. Further, PDAs 132, 134 and 136 may require a medium communication throughput and may be operated by batteries of relatively low capacity. Therefore, a medium DTIM period, for example 4, may be suitable for PDAs 132, 134 and 136.

Currently, an access point is able to store only a single DTIM period. Consequently, different client devices in power-save mode will all wake up for the same beacon frames according to the DTIM period. Currently, a network manager may need to balance the conflicting requirements for power consumption and communication throughput when in power-save mode of client devices in different wireless networks when configuring the DTIM period of an access point.

According to an embodiment of the invention, an access point with support for two or more SSIDs may have SSID-dependent DTIM periods rather than a single DTIM period for all SSIDs. In other words, the network manager may configure the access point with DTIM periods on a per SSID basis. A network manager may consider the requirements of power consumption and communication throughput of client devices in a particular wireless networks when determining which DTIM period to configure for which SSID. A higher DTIM period may increase the potential savings in power consumption but may reduce the communication throughput, and vice versa. In the example shown in FIG. 1, AP 102 may be configured to associate a DTIM period of 2 to wireless network 110, a DTIM period of 8 to wireless network 120, and a DTIM period of 4 to wireless network 130.

Some access points that are configurable to support two or more SSIDs transmit only a single sequence of beacon frames, namely the beacon frames for a single, default SSID.

For example, beacon frames 200 of FIG. 2 may be part of the single sequence transmitted by AP 102. Client devices in wireless network 110 ("LAPTOP") will listen for DTIMs every other beacon frame, as indicated by arrows 202. Client devices in wireless network 120 ("CELLS") will listen for DTIMs every eight beacon frame, as indicated by arrows 210. Client devices in wireless network 130 ("PDAS") will listen for DTIMs every fourth beacon frame, as indicated by arrows 208. AP 102 will ensure that if it has buffered broadcast and/or multicast traffic for client devices in wireless network 120, the DTIM indicating the presence of this buffered traffic is included in a DTIM that will be listened to by client devices belonging to wireless network 120.

In one scenario, AP 102 may have buffered multicast traffic for PDAs 132 and 134 but not for PDA 136. AP 102 will include an appropriate DTIM in the next beacon frame to be listened to by client devices of wireless network 130, for example, beacon frame 212, and will transmit the buffered multicast data (shown graphically as a diagonally hatched block 214) after beacon frame 212 and before the next beacon frame after beacon frame 212.

In a system involving client devices and an access point that is configurable to support two or more SSIDs yet transmits only a single sequence of beacon frames, there are numerous possibilities to ensure that the client devices are aware of the current DTIM period value for the SSID to which they belong.

Some of the possibilities involve changes to the standard use of 802.11-defined management frames. For example, although the length of the Beacon Interval Field in the Beacon Frame Format is 16 bits, the lower 8 bits of the field are generally sufficient to store the value of the beacon interval. Therefore, the upper 8 bits of the Beacon Interval Field could be used to carry the DTIM period value for a particular SSID so that client devices belonging to a wireless network with that SSID would be informed of the DTIM period value by the access point. Alternatively, reserved bits of the Capability Information Field in the Association Response Frame Format could be used to carry the DTIM period value for a particular SSID so that the access point informs the client device of the DTIM period value during the association process. Alternatively, any other bits of a field of a suitable management frame could be used. In another example, to inform client devices belonging to a particular wireless network of an updated DTIM period value for that network, the access point could use a newly defined management frame.

Others of the possibilities do not involve changes to the standard use of 802.11-defined management frames. For example, an access point may send the current DTIM period value for a particular wireless network in a data frame that is multicast to all client devices belonging to the particular wireless network. The client devices would decode the data frame and store the DTIM period value internally for future use in power-save mode. Alternatively, client devices unaware of the DTIM period value for the wireless network to which they belong would listen to all beacons and identify the DTIM period value from the periodicity of DTIMs having indications for client devices in that wireless network. This would require the client devices to have knowledge of the existence of the other client devices in that wireless network.

Other access points that are configurable to support two or more SSIDs transmit a separate beacon frame sequence for each of the SSIDs. Such access points may include the SSID-dependent DTIM period in each beacon of the beacon frame sequence for a particular SSID.

Figure 3:
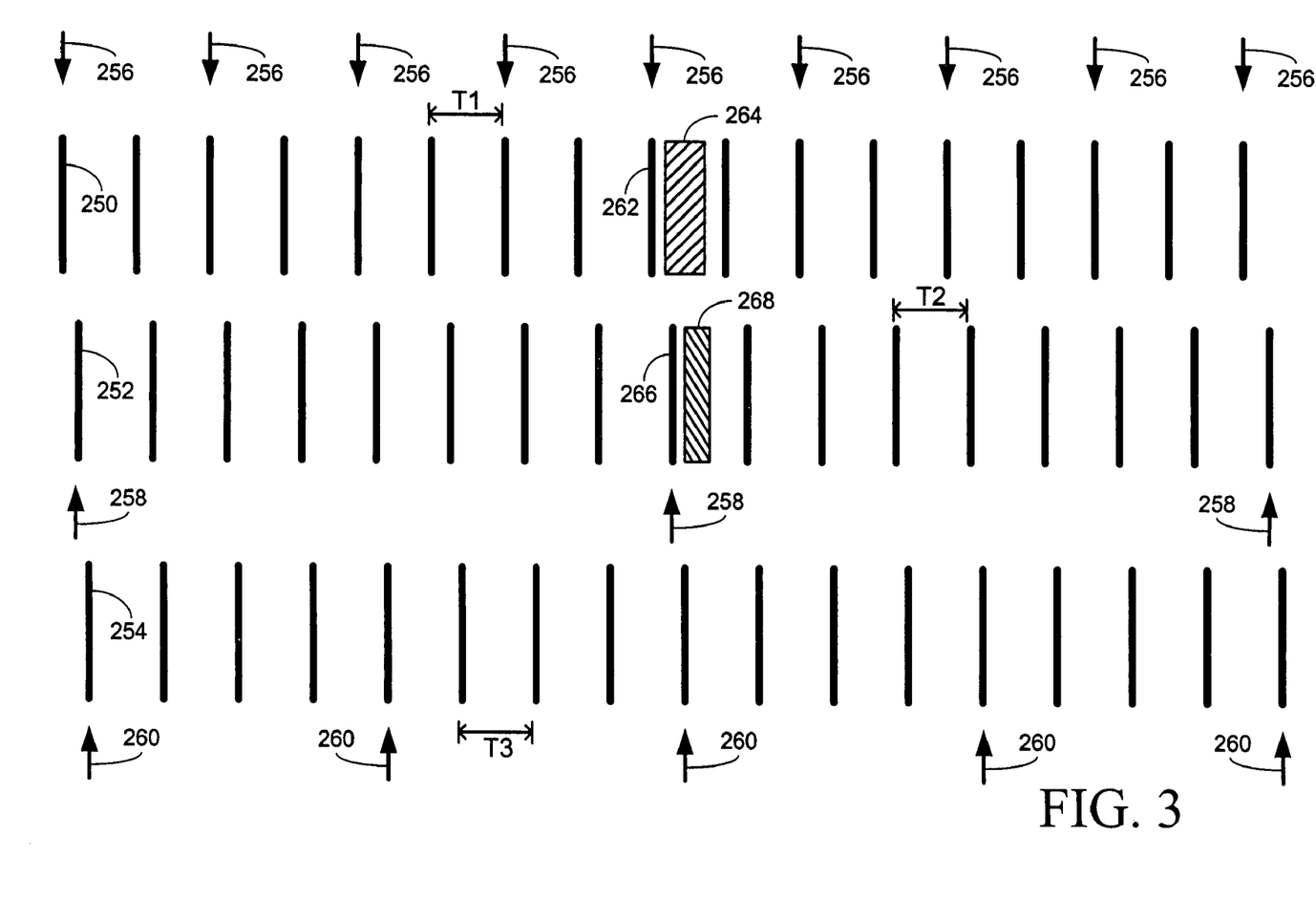
FIG. 3 is an illustration of several exemplary sequences of beacon frames, helpful in understanding other embodiments of the invention.

For example, FIG. 3 shows a sequence of beacon frames 250 at intervals of T1 for wireless network 110, each beacon frame 250 including a DTIM period of 2; a sequence of beacon frames 252 at intervals of T2 for wireless network 120, each beacon frame 250 including a DTIM period of 8; and a sequence of beacon frames 254 at intervals of T3 for wireless network 130, each beacon frame 254 including a DTIM period of 4. AP 102 includes Delivery Traffic Indication Messages for wireless network 110 every other beacon frame 250, as indicated by arrows 256. AP 102 includes Delivery Traffic Indication Messages for wireless network 120 every eighth beacon frame 252, as indicated by arrows 258. AP 102 includes Delivery Traffic Indication Messages for wireless network 130 every fourth beacon frame 254, as indicated by arrows 260.

In one scenario, AP 102 may have buffered broadcast traffic for all client devices in wireless network 110. AP 102 will include an appropriate DTIM in the next beacon frame to be listened to by client devices of wireless network 110, for example, beacon frame 262, and will transmit the buffered broadcast data (shown graphically as diagonally hatched block 264) after beacon frame 262 and before the next beacon frame in the sequence after beacon frame 262.

In another scenario, AP 102 may have buffered multicast data for cellphones 122 and 124 but not for cellphones 126 and 128. AP 102 will include an appropriate DTIM in the next beacon frame to be listened to by client devices of wireless network 120, for example, beacon frame 266, and will transmit the buffered multicast data (shown graphically as diagonally hatched block 268) after beacon frame 266 and before the next beacon frame in the sequence after beacon frame 266.

Figure 4:
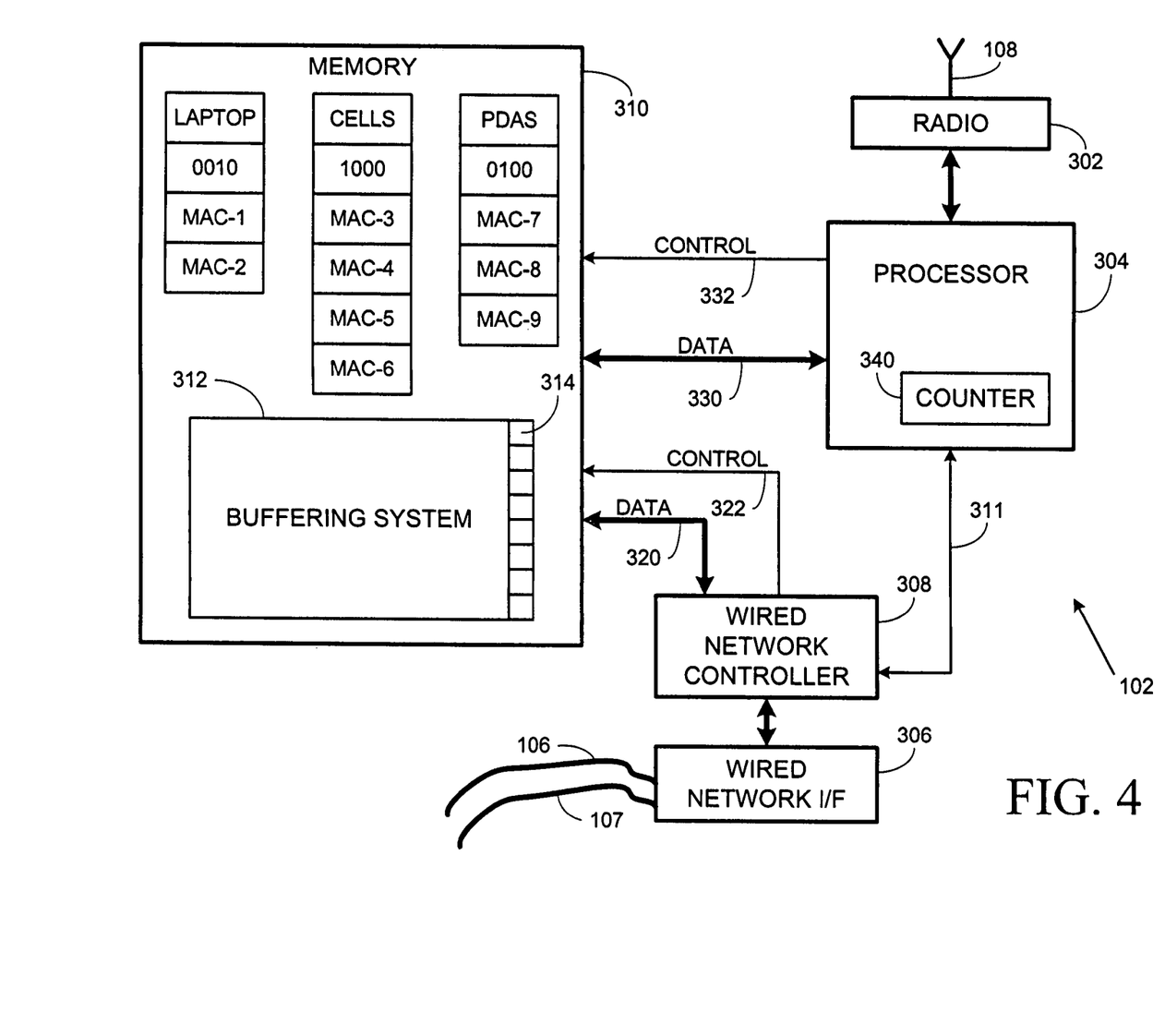
FIG. 4 is a block diagram of an exemplary access point, according to an embodiment of the invention.

FIG. 4 is a block diagram of an exemplary access point according to an embodiment of the invention. AP 102 includes at least one antenna 108 coupled to a radio 302, which in turn is coupled to a processor 304 having baseband functionality. A non-exhaustive list of examples for processor 304 includes a central processing unit (CPU), a digital signal processor (DSP), a reduced instruction set computer (RISC), a complex instruction set computer (CISC) and the like. Furthermore, processor 304 may be part of an application specific integrated circuit (ASIC) or may be a part of an application specific standard product (ASSP).

AP 102 also includes a wired network interface 306 coupled to a wired network controller 308. The wired network (s) may be, for example, Ethernet network(s), token rings, Universal Serial Bus (USB), wired network(s) according to the IEEE 1394-1995, IEEE 1394a-2000, and IEEE 1394b standards (commonly known as "FireWire"), or any combination thereof. Wired network interface 306 is able to use wired connections 106 and 107.

Radio 302 and processor 304 may be part of the same integrated circuit or in separate integrated circuits. Similarly, processor 304 and wired network controller 308 may be part of the same integrated circuit or in separate integrated circuits.

AP 102 also includes a memory 310, which may be fixed in or removable from AP 102. Memory 310 may be coupled to processor 304 or partly embedded in processor 304. A non-exhaustive list of examples for memory 310 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

Processor 304 and wired network controller 308 may be coupled by signals 311 to coordinate their activities, for example access to memory 310.

Memory 310 may store associations of two or more SSID values to respective DTIM periods, and of two or more SSID values to the MAC addresses of client devices belonging to the wireless network identified by the SSID value. For example, memory 310 may store the association of the SSID "LAPTOP" with the DTIM period 2 ("0010" in binary notation) and with the MAC addresses of laptops 112 and 114 (denoted "MAC-1" and "MAC-2", respectively). Similarly, memory 310 may store the association of the SSID "CELLS" with the DTIM period 8 ("1000" in binary notation) and with the MAC addresses of cellphones 122, 124, 126 and 128 (denoted "MAC-3", "MAC-4", "MAC-5" and "MAC-6", respectively). Similarly, memory 310 may store the association of the SSID "PDAS" with the DTIM period 4 ("0100" in binary notation) and with the MAC addresses of PDAs 132, 134 and 136 (denoted "MAC-7", "MAC-8" and "MAC-9", respectively). Alternatively, any or all of these associations may be stored internally in processor 304.

Memory 310 may also include a buffering system 312 to store incoming traffic destined for client devices. For example, data 320 of incoming traffic may be transferred to buffering system 312 under control signals 322 of wired network controller 308, and a flag 314 in buffering system 312 may be set to indicate that buffering system 312 stores data for a particular client device.

One or more counters 340, located for example in processor 304, may be used for the purpose of managing, on a per SSID basis, the timing of transmission of DTIMs to wireless client devices belonging to different wireless networks managed by AP 102.

Figure 5:
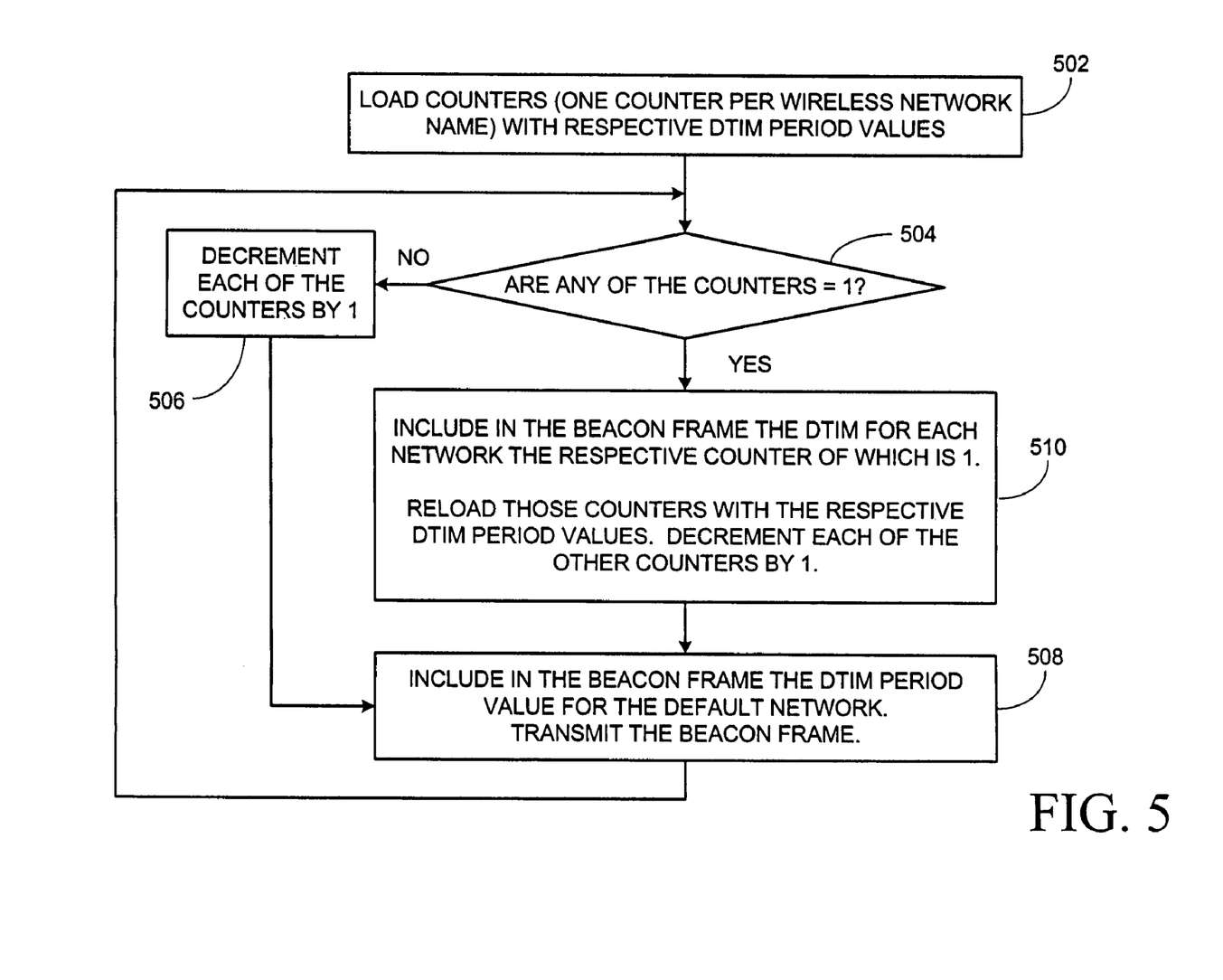
FIG. 5 is a flowchart of an exemplary method to be implemented by the access point, according to an embodiment of the invention.

FIG. 5 is a flowchart of an exemplary method for implementation in AP 102, according to an embodiment of the invention. In this embodiment, AP 102 is an access point that transmits only a single sequence of beacon frames, namely the beacon frames for a single, default SSID.

Counters (for example, one per DTIM period value or one per SSID) are loaded with respective DTIM period values (502).

If none of the counters has the value 1 (checked in block 504), then each counter is decremented by 1 (506), the DTIM period value associated with the default SSID is included in the beacon frame and the beacon frame is transmitted (508).

If any of the counters has the value 1 (checked in block 504), then the following actions occur (510):
   a) DTIMs for the wireless networks for which the counters have the value 1 are included in the beacon frame;
   b) the counters having the value 1 are reloaded with the respective DTIM period values; and
   c) the counters not having the value 1 are decremented by 1.

The method then continues to block 508, in which the DTIM period value associated with the default SSID is included in the beacon frame and the beacon frame is transmitted.

After block 508, the method resumes from block 504, in which the values of the counters is checked.

Figure 6:
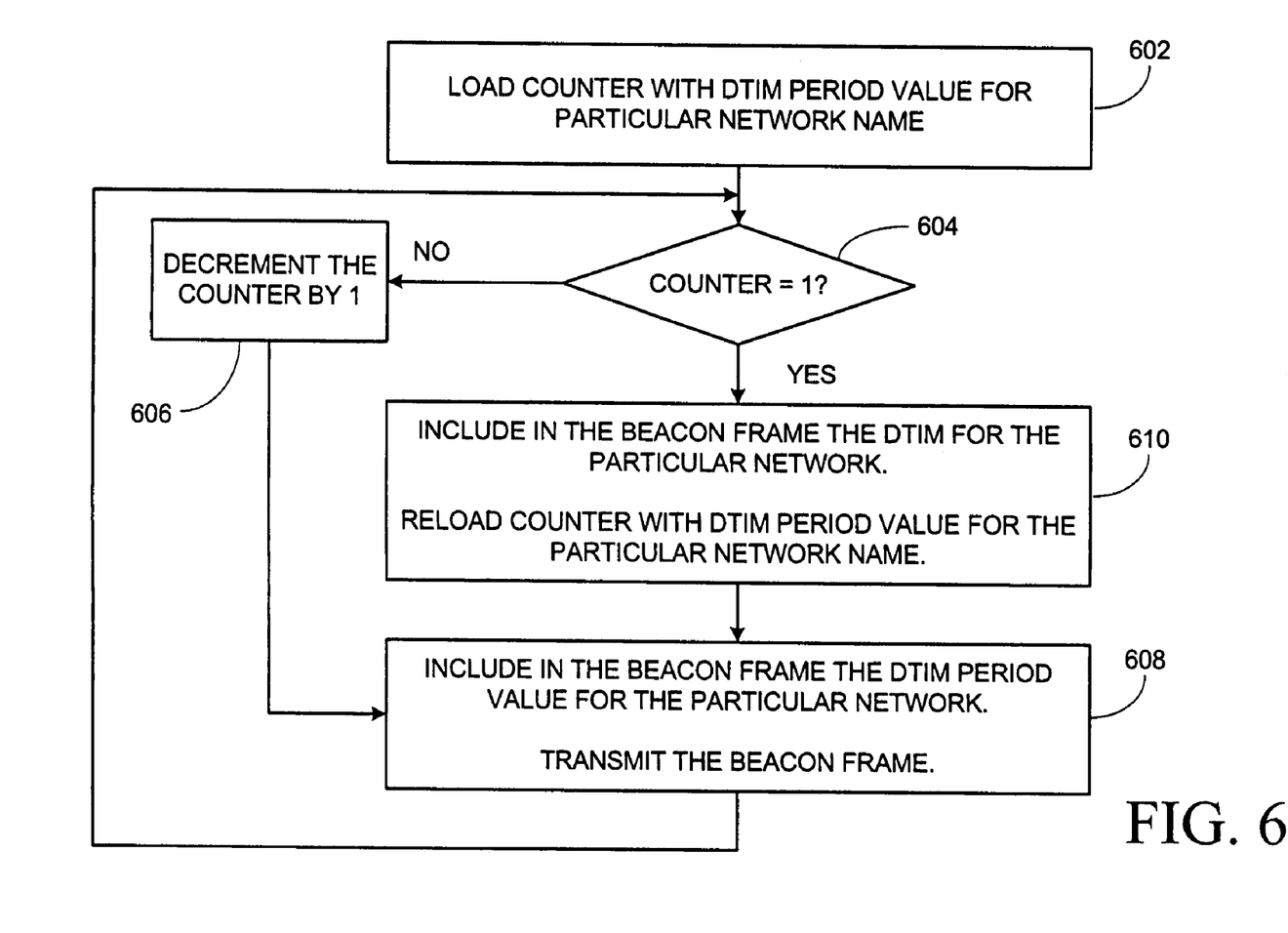
FIG. 6 is a flowchart of an exemplary method to be implemented by the access point, according to another embodiment of the invention.

FIG. 6 is a flowchart of an exemplary method for implementation in AP 102, according to another embodiment of the invention. In this embodiment, AP 102 is an access point that transmits a separate beacon frame sequence for each of the SSIDs.

The method of FIG. 6 may be implemented in parallel for each SSID.

A counter is loaded with the DTIM period value for a particular SSID (602).

If the counter does not have the value 1 (checked in block 604), then the counter is decremented by 1 (606), the DTIM period value associated with the particular SSID is included in the beacon frame and the beacon frame is transmitted (608).

If the counter has the value 1 (checked in block 604), then the following actions occur (610):
   a) a DTIM for the wireless network having the particular SSID is included in the beacon frame; and
   b) the counter is reloaded with the DTIM period value for the particular SSID.

The method then continues to block 608, in which the DTIM period value associated with the particular SSID is included in the beacon frame and the beacon frame is transmitted.

After block 608, the method resumes from block 604, in which the value of the counter is checked.

The counter-based schemes described above with respect to FIG. 5 and FIG. 6 are just examples, and it is obvious to a person of ordinary skill how to implement alternative management schemes for the timing of the DTIMs according to embodiments of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. An access point configurable to support concurrently a first wireless network having a first network name and a second wireless network having a second network name, the access point comprising:
   one or more antennae;
   a radio coupled to said one or more antennae;
   a memory to store an indication of a first delivery traffic indication message 'DTIM' period value associated with said first network name and to store an indication of a second, different DTIM period value associated with said second network name; and
   a processor, coupled to said radio and to said memory, to transmit via said radio a sequence of beacon frames at regular beacon intervals that are specified in said beacon frames, to include DTIMs for said first wireless network in a first subset of said sequence and to include DTIMs for said second wireless network in a second subset of said sequence,
   wherein said beacon frames specify said first DTIM period value, the interval between beacon frames in said first subset is the product of said first DTIM period value and said beacon interval, and the interval between beacon frames in said second subset is the product of said second DTIM period value and said beacon interval.

2. The access point of claim 1, wherein said access point is compatible with IEEE 802.11a.

3. The access point of claim 1, wherein said access point is compatible with IEEE 802.11b.

4. The access point of claim 1, wherein said access point is compatible with IEEE 802.11g.

5. The access point of claim 1, wherein said beacon frames specify said second DTIM period value.

6. The access point of claim 1, wherein some of said beacon frames belong to said first subset and to said second subset.

7. A wireless system comprising:
   a first wireless client device configurable to belong to a first wireless network having a first network name;
   a second wireless client device configurable to belong to a second wireless network having a second network name; and
   an access point configurable to transmit a second of beacon frames at regular beacon intervals that are specified in said beacon frames, to include delivery traffic indication messages for said first wireless network in a first subset of said sequence, and to include delivery traffic indication messages for said second wireless network in a second subset of said sequence,
   wherein said beacon frames specify a first delivery traffic indication message 'DTIM' period value associated with said first network name, the interval between beacon frames in said first subset is the product of said beacon interval and said first DTIM period value, and the interval between beacon frames in said second subset is the product of said beacon interval and a second, different DTIM period value that is associated with said second network name.

8. The wireless system of claim 7, wherein said access point is to inform said second wireless client device of said second DTIM period value during an association process for said second wireless network.

9. The wireless system of claim 7, wherein said access point and said wireless client devices are compatible with IEEE 802.11a.

10. The wireless system of claim 7, wherein said access point and said wireless client devices are compatible with IEEE 802.11b.

11. The wireless system of claim 7, wherein said access point and said wireless client devices are compatible with IEEE 802.11g.

12. The wireless system of claim 7, wherein said beacon frames specify said second DTIM period value.

13. The wireless system of claim 7, wherein some of said beacon frames belong to said first subset and to said second subset.

14. A method in an access point, the method comprising:
transmitting a sequence of beacon frames at regular beacon intervals that are specified in said beacon frames, wherein said beacon frames specify a first delivery traffic indication message 'DTIM' period value;
including delivery traffic indication messages for a first wireless network managed by said access point in a first subset of said sequence of beacon frames, wherein the first wireless network has a first network name and the interval between beacon frames in said first subset is the product of said first DTIM period value and said beacon interval; and
including delivery traffic indication messages for a second wireless network managed by said access point in a second subset of said sequence of beacon frames, wherein the second wireless network has a second network name and the interval between beacon frames in said second subset is the product of a second, different, DTIM period value and said beacon interval.

15. The method of claim 14, further comprising:
providing said second DTIM period value to a client device belonging to said second wireless network during an association process for said second network.

16. The method of claim 14, further comprising:
if a client device belonging to said first wireless network is in a power save mode, buffering broadcast and/or multicast data for said first wireless network;
specifying the existence of said buffered data in a beacon frame of said first subset; and
transmitting said buffered data following said beacon frame and prior to transmitting a next beacon frame of said first subset.

17. The method of claim 14, further comprising:
if a client device belonging to said second wireless network is in a power save mode, buffering broadcast and/or multicast data for said second wireless network;
specifying the existence of said buffered data in a beacon frame of said second subset; and
transmitting said buffered data following said beacon frame and prior to transmitting a next beacon frame of said second subset.

18. The method of claim 14, further comprising:
specifying said second DTIM period value in said beacon frames.

19. The method of claim 14, further comprising:
providing said second DTIM period value to a client device belonging to said second wireless network via a management frame.

20. The method of claim 14, further comprising:
transmitting multicast data comprising said second DTIM period value to client devices belonging to said second wireless network.

21. The method of claim 14, wherein some of said beacon frames belong to said first subset and to said second subset.

* * * * *

UNITED STATES PATENT AND TRADEMARK OFFICE
CERTIFICATE OF CORRECTION

| | | |
|---|---|---|
| PATENT NO. | : 7,420,942 B2 | Page 1 of 1 |
| APPLICATION NO. | : 11/008023 | |
| DATED | : September 2, 2008 | |
| INVENTOR(S) | : James Wang | |

It is certified that error appears in the above-identified patent and that said Letters Patent is hereby corrected as shown below:

Claim 7, Col. 8 line 52, "a second of beacon" should be changed to --a sequence of beacon--.

Signed and Sealed this

Twenty-third Day of December, 2008

JON W. DUDAS
*Director of the United States Patent and Trademark Office*